Patented July 15, 1947

2,423,927

UNITED STATES PATENT OFFICE 2,423,927

CONSTANT VISCOSITY HYDRAULIC FLUID COMPOSITIONS

Robert E. Burk and Everett C. Hughes, Cleveland Heights, Ohio, assignors to The Standard Oil Company, Cleveland, Ohio, a corporation of Ohio No Drawing. Application May 22, 1942, Serial No. 444,118

4 Claims. (Cl. 252—78)

This invention relates to liquids having very little variation in viscosity with change of temperature, and thus which can be advantageously applied in such usages as the fluid in hydraulic brakes, shock absorbers, transmissions, etc. Liquids heretofore known for such uses have very considerable variation in viscosity with change of temperature, and thus the operating characteristics of the fluid are detrimentally unfavorably effected by weather and temperature change. We have found however in accordance with the present invention that certain combinations of materials as hereinafter detailed form products which have an amazing decrease in the change of viscosity with temperature.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In general, the invention involves a high molecular weight polymer and special solvents, and there is a critical character in the particular combination brought together to attain the peculiarity that the temperature-viscosity curve is surprisingly flat. Liquids are, in present physical theory, understood to have a definite molecular structure, and to involve aggregated molecules resembling crystal arrangement in some respects; and dissolved polymers may be visualized as in more or less aggregated condition, and more or less solvent is associated with this aggregate and thereby is in a sense "immobilized," and apparently the more solvent immobilized the greater the viscosity resultant, but where the solvent is of a character which at low temperatures dissolves less in the polymer aggregates than at high temperature less solvent is immobilized, and the viscosity-temperature curve is correspondingly flat.

Polymers applicable in the present usage are high molecular weight polymers, viz. polyisobutylene, polystyrene, polycetyl methacrylate, and these are referred to hereinafter as "high molecular weight polymer material." Two or more of the high molecular weight polymers may also be used. The solvent is a non-paraffinic low molecular weight low viscosity organic solvent, viz. chlorobenzene, amyl naphthalene, ethyl benzene, toluene, xylenes, mesitylenes, triethylbenzene. That is, substituted aromatic hydrocarbon or halogen-substituted aromatic liquids are to be used. And such are referred to hereinafter as "low molecular weight low viscosity liquid aromatic compounds." In some instances a plurality of solvents may be applied.

Among such additional solvents there may be employed dichloroethylene, alpha-chloronaphthalene, o-dichlorobenzene, n-amyl ether, etc. When using two or more solvents, it is sometimes advantageous to add what is for conciseness hereinafter designated a "dispersing agent," viz. the condensation product of naphthalene and wax commercially known as "Paraflow," sodium sulphonates, heavy metal naphthenates, and which may be dissolved in minor amount, such as 0.1 to 5 per cent.

As an example: 3.81 weight per cent of polyisobutylene (molecular weight about 100,000) is made up into solution with chlorobenzene.

As another example: 4.68 per cent by weight of polyisobutylene is made up into solution in a solvent comprising dichloroethylene 23.1 per cent and toluene 76.9 per cent.

As another example: 4.89 weight per cent of polyisobutylene is made up into solution with ethyl benzene.

As another example: 3.66 weight per cent of polyisobutylene is made up into solution with toluene.

Similarly, the other polymers of like high molecular weight may be made up into solution. Other illustrative combinations of solvents are for instance triethylbenzene and toluene, etc.

It is seen that the present compositions are in sharp contrast to compositions of lubricating oils or petroleum naphthas, or in general petrolum hydrocarbon liquids, to which polymers have been added. Such petroleum compositions do not have a flat viscosity-temperature curve, but are characterized by an enormous change of viscosity with change of temperature. On the other hand compositions involving solvents such as toluene and those above pointed out with selected polymers have surprisingly little viscosity change, and the invention resides in combining the particular solvents and polymers indicated.

The following measurements are illustrative of properties and compositions as foregoing, involving examples having a choice of viscosities for different kinds of usage:

| Solvent | Polyisobutylene, Wt. Per cent | Viscosity, Centistokes | | | | Per cent Increase |
|---|---|---|---|---|---|---|
| | | At 5° F. | At 32° F. | At 100° F. | At 140° F. | |
| Toluene | 3.66 | 123 | 105.1 | 74.0 | 62.3 | 98 |
| Toluene 76.9%, Dicholoroethylene 23.1% | 4.68 | 388 | 312.9 | 199.8 | 161 | 141 |
| Toluene 78.8%, O-dichlorobenzene 21.1% | 4.73 | 490 | 397.5 | 246.4 | 194 | 153 |
| Ethyl-benzene | 4.89 | 382 | 310.2 | 196.2 | 157 | 143 |
| Chloro-benzene | 3.81 | 126 | 102.7 | 67.3 | 54 | 133 |

By comparison, 100 V. I. lubricating oil has a viscosity of 137 centistokes at 5° F. but 65,000 at 140° F., i. e., a viscosity increase of 47,350%; and a paraffine hydrocarbon such as heptane with 3.88% of polyisobutylene has a viscosity of only 28.3 cs. at 140° F., 36.7 at 100° F., 63.5 at 32° F., and 82.5 at 5° F., a viscosity increase of 191%.

Other modes of applying the principle of the invention may be employed, change being made as regards the details described, provided the features stated in any of the following claims, or the equivalent of such, be employed.

We therefore particularly point out and distinctly claim as our invention:

1. A liquid composition having small change of viscosity with temperature change, which consists of at least one aromatic compound from the group consisting of toluene, xylenes, mesitylenes, ethyl benzene, triethylbenzene, chlorobenzene, dichlorobenzene, alpha chloronaphthalene, and amyl naphthalene, and between 3 and 5 per cent by weight of polyisobutylene of molecular weight about 100,000 carried thereby.

2. A liquid composition having small change of viscosity with temperature change, consisting of ethyl benzene, and between 3 and 5 per cent by weight of polyisobutylene of molecular weight about 100,000 carried in such liquid.

3. A liquid composition having small change of viscosity with temperature change, consisting of chlorobenzene, and between 3 and 5 per cent by weight of polyisobutylene of molecular weight about 100,000 carried in such liquid.

4. A liquid composition having small change of viscosity with temperature change, consisting of toluene, and between 3 and 5 per cent by weight of polyisobutylene of molecular weight about 100,000 carried in such liquid.

ROBERT E. BURK.
EVERETT C. HUGHES.

REFERENCES CITED

The following references are of record in the file of this patent:

UNITED STATES PATENTS

| Number | Name | Date |
| --- | --- | --- |
| 1,929,453 | Semon | Oct. 10, 1933 |
| 2,041,052 | Donaldson et al. | May 19, 1936 |
| 2,069,983 | Ubben | Feb. 9, 1937 |
| 2,186,124 | Rash | Jan. 9, 1940 |
| 2,135,092 | Maverick | Nov. 1, 1938 |
| 2,138,895 | Wiezevich | Dec. 6, 1938 |
| 2,104,408 | Wiezevich | Jan. 4, 1938 |
| 2,356,367 | Wright | Aug. 22, 1944 |
| 2,366,794 | Lamb | Jan. 9, 1945 |
| 2,061,570 | Frolich et al. | Nov. 24, 1936 |
| 2,340,946 | Ellis | Feb. 8, 1944 |
| 2,391,092 | Horback | Dec. 18, 1945 |

OTHER REFERENCES

"British Plastics," Article entitled "Synthetic Rubber and Plastics," IX, by Dr. Harry Barron, February 1942, pp. 345, 348. (Copy in Div. 50.)

Thomas et al., in Ind. and Eng. Chem., vol. 32, No. 3, March 1940, pp. 299–304. Article entitled "Polybutenes." (Copy in Div. 50.) 260–94.